(12) United States Patent
Ohgitani et al.

(10) Patent No.: US 9,016,417 B2
(45) Date of Patent: Apr. 28, 2015

(54) BATTERY UNIT MOUNTING APPARATUS AND BATTERY UNIT MOUNTING STRUCTURE

(71) Applicant: Kabushiki Kaisha Toyota Jidoshokki, Kariya-shi, Aichi (JP)

(72) Inventors: Ikkei Ohgitani, Kariya (JP); Takahiro Fukagawa, Kariya (JP); Yoshio Ojima, Kariya (JP); Akihiko Motoya, Kariya (JP); Hideyuki Maki, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 0 days.

(21) Appl. No.: 14/151,280

(22) Filed: Jan. 9, 2014

(65) Prior Publication Data

US 2014/0196966 A1 Jul. 17, 2014

(30) Foreign Application Priority Data

Jan. 11, 2013 (JP) ................................. 2013-003331

(51) Int. Cl.
*B60R 16/04* (2006.01)
*B60K 1/04* (2006.01)

(52) U.S. Cl.
CPC ........... *B60K 1/04* (2013.01); *B60K 2001/0472* (2013.01)

(58) Field of Classification Search
CPC ..................... B60K 2001/0472; Y02T 90/124; B60L 11/1822
USPC ........................................................ 180/68.5
See application file for complete search history.

(56) References Cited

U.S. PATENT DOCUMENTS

| 5,305,513 | A | * | 4/1994 | Lucid et al. ................ 29/402.08 |
| 5,998,963 | A | * | 12/1999 | Aarseth ......................... 320/109 |
| 6,698,540 | B1 | * | 3/2004 | Decker, Jr. .................... 180/181 |
| 2012/0217077 | A1 | * | 8/2012 | Ojima et al. ................. 180/68.5 |

FOREIGN PATENT DOCUMENTS

| DE | 2214647 A1 | 9/1973 |
| FR | 2964352 A1 | 3/2012 |
| JP | 2003-118397 A | 4/2003 |
| JP | 2010-173364 A | 8/2010 |

OTHER PUBLICATIONS

Communication dated May 14, 2014, issued by the European Patent Office in corresponding application No. 14150559.4.

* cited by examiner

*Primary Examiner* — Hau Phan
*Assistant Examiner* — Bryan Evans
(74) *Attorney, Agent, or Firm* — Sughrue Mion, PLLC

(57) ABSTRACT

A battery unit mounting apparatus for mounting a battery unit to a vehicle from a bottom face side of the vehicle comprises a table having a mount surface for mounting the battery unit, a lift for moving the table up and down with respect to the bottom face of the vehicle, and a connection mechanism for connecting the table and the lift to each other. The connection mechanism connects the table and the lift to each other such that the battery unit or table comes into contact with the bottom face of the vehicle so as to tilt the mount surface by a predetermined inclination with respect to the bottom face of the vehicle.

3 Claims, 4 Drawing Sheets

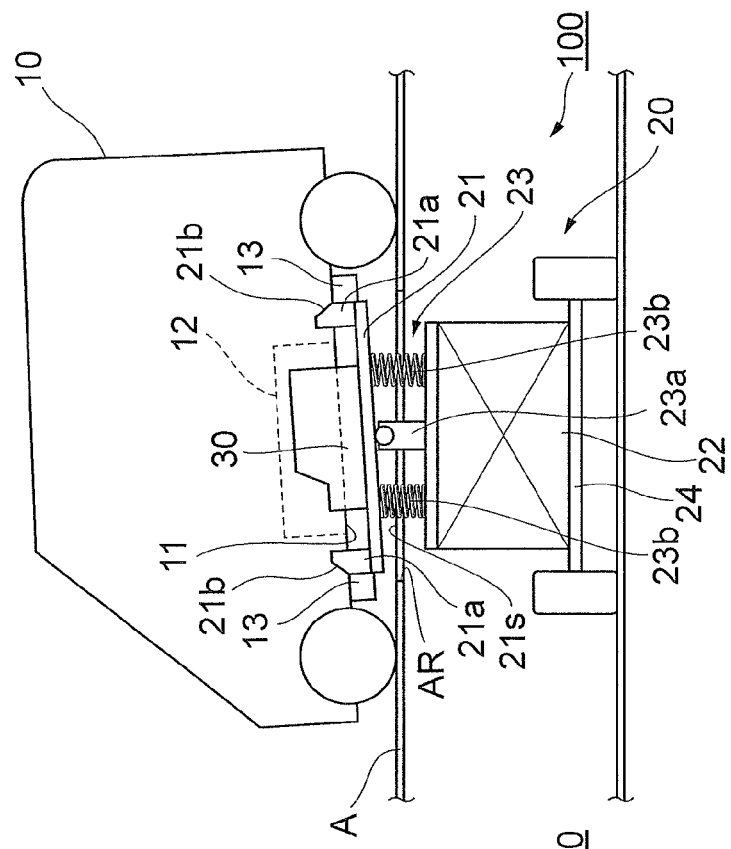
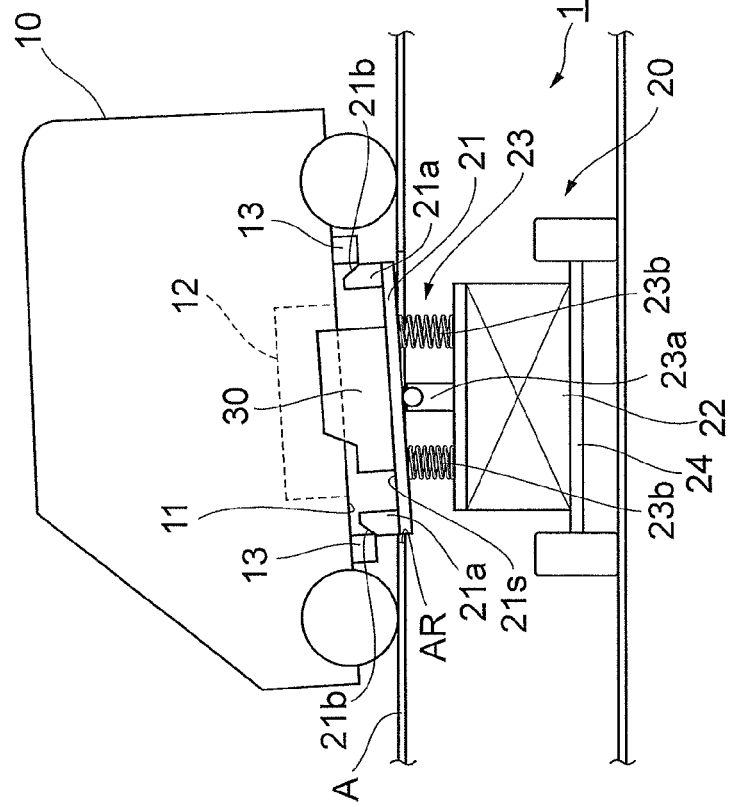

BATTERY UNIT MOUNTING APPARATUS AND BATTERY UNIT MOUNTING STRUCTURE

BACKGROUND OF THE INVENTION

1. Field of the Invention

One aspect of the present invention relates to a battery unit mounting apparatus and battery unit mounting structure for mounting a battery unit to a vehicle from its bottom face side.

2. Related Background Art

Japanese Patent Application Laid-Open No. 2010-173364 (hereinafter referred to as "Patent Literature 1") discloses a battery mounting apparatus aimed at making a battery attachable and detachable regardless of the inclination of a vehicle body. For achieving the aim in the battery mounting apparatus disclosed in Patent Literature 1, the state of inclination of a polyhedral jig having a plurality of fixing jigs for fixing a battery is adjusted beforehand according to the inclination of the vehicle body. More specifically in the battery mounting apparatus, a position detection sensor detects the inclination in a pitch direction of a vehicle body floor, and the amount of rotation of a rotary actuator about a first rotary axis is corrected according to the inclination, so as to adjust the state of inclination of the polyhedral jig. Thereafter, the position detection sensor further detects the inclination in a roll direction of the vehicle body floor, and the amount of rotation of the rotary actuator about a second rotary axis is corrected, so as to adjust the state of inclination of the polyhedral jig.

SUMMARY OF THE INVENTION

The above-mentioned battery mounting apparatus disclosed in Patent Literature 1 may seem to make the battery attachable and detachable regardless of the inclination of the vehicle body. However, the battery mounting apparatus disclosed in Patent Literature 1 necessitates a plurality of sensors, actuators, control means, and the like therefor and becomes a large-scale one involved with the whole structure of a battery exchange station. Further, laser sensors employed as position detection sensors are susceptible to stains. Therefore, stains such as mud attached to the vehicle body or dirt falling on the position detection sensors from the bottom face of the vehicle body may lower the detection accuracy of the position detection sensors.

It is an object of one aspect of the present invention to provide a battery unit mounting apparatus and battery unit mounting structure which, in a simple structure, can easily mount a battery unit to a vehicle even when the vehicle is tilted.

The battery unit mounting apparatus in accordance with one aspect of the present invention is a battery unit mounting apparatus for mounting a battery unit to a vehicle from a bottom face side of the vehicle, the apparatus comprising a table having a mount surface for mounting the battery unit, a lift for moving the table up and down with respect to the bottom face of the vehicle, and a connection mechanism for connecting the table and the lift to each other; wherein the connection mechanism connects the table and the lift to each other such that the battery unit or table comes into contact with the bottom face of the vehicle so as to tilt the mount surface by a predetermined inclination with respect to the bottom face of the vehicle.

In this battery unit mounting apparatus, the table for mounting the battery unit and the lift for moving the table up and down with respect to the vehicle are connected to each other with the connection mechanism. In particular, the connection mechanism connects the table and the lift to each other so as to tilt the mount surface by a predetermined inclination with respect to the bottom face of the vehicle according to the contact between the battery unit or table and the bottom face of the vehicle. Here, the predetermined inclination is an inclination suitable for fixing the battery unit to the vehicle. Therefore, when the table is moved up by the lift in the battery unit mounting apparatus in order to mount the battery, the mount surface tilts appropriately with respect to the vehicle for mounting the battery unit. Hence, in a simple structure, the battery unit mounting apparatus can easily mount the battery to the vehicle even when the vehicle is tilted.

The battery unit mounting apparatus in accordance with one aspect of the present invention may be constructed such that the mount surface of the table is provided with a plurality of contact pieces adapted to come into contact with the bottom face of the vehicle when the table is moved up by the lift, while the mount surface tilts substantially parallel to the bottom face of the vehicle according to the contact between the contact pieces of the mount surface and the bottom face of the vehicle. In this case, the battery unit does not come into contact with the vehicle when tilting the mount surface, and no heavy load acts on a part of the battery unit.

In the battery unit mounting apparatus in accordance with one aspect of the present invention, the connection mechanism may have a ball joint for connecting the table and the lift to each other while making the mount surface of the table tiltable, and an elastic member for generating an elastic force between the table and the lift so as to regulate the tilt of the mount surface. Thus constructing the connection mechanism can easily and securely keep the mount surface and the bottom face of the vehicle substantially parallel to each other according to the contact between the contact pieces of the mount surface and the bottom face of the vehicle.

The battery unit mounting structure in accordance with one aspect of the present invention is a battery unit mounting structure for mounting a battery unit to a vehicle from a bottom face side of the vehicle, the structure comprising the above-mentioned battery unit mounting apparatus and a guide member, disposed on the bottom face of the vehicle, for tilting the mount surface substantially parallel to the bottom face by coming into contact with the contact piece disposed on the mount surface.

This battery unit mounting structure is equipped with the above-mentioned battery unit mounting apparatus. Therefore, a simple structure can easily mount the battery unit to the vehicle. In particular in the battery unit mounting structure, the bottom face of the vehicle is provided with the guide member adapted to come into contact with the contact pieces disposed on the mount surface of the table. Therefore, the guide member can securely make the mount surface and the bottom face of the vehicle substantially parallel to each other while preventing the contact piece and the bottom face of the vehicle from coming into first contact with each other.

One aspect of the present invention can provide a battery unit mounting apparatus and battery unit mounting structure which, in a simple structure, can easily mount a battery unit to a vehicle even when the vehicle is tilted.

BRIEF DESCRIPTION OF THE DRAWINGS

FIGS. 4A and 4B are diagrams for explaining how to mount the battery unit by using the battery unit mounting structure depicted in FIG. 1.

DESCRIPTION OF THE PREFERRED EMBODIMENTS

Figure 1:
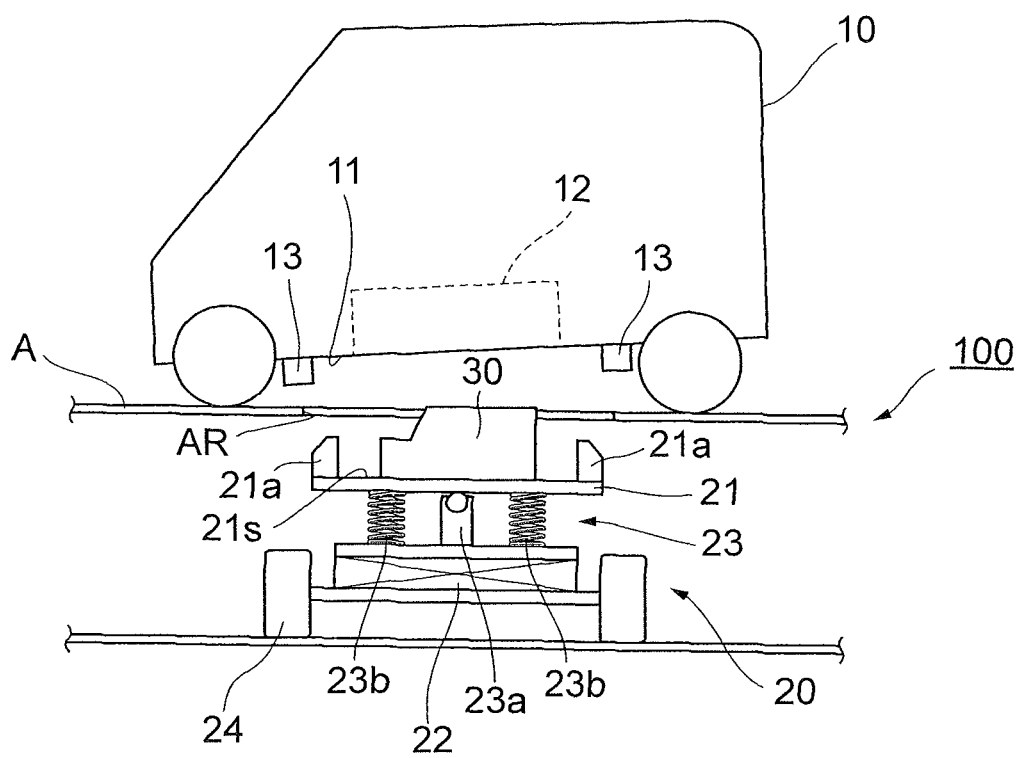
FIG. 1 is a schematic side view illustrating an embodiment of the battery unit mounting structure in accordance with one aspect of the present invention.

In the following, an embodiment of the battery unit mounting apparatus and battery unit mounting structure in accordance with one aspect of the present invention will be explained in detail with reference to the drawings. In the explanation of the drawings, the same or equivalent constituents will be referred to with the same signs while omitting their overlapping descriptions. Scales of parts in the drawings may differ from those in practice.

FIG. 1 is a schematic side view illustrating an embodiment of the battery unit mounting structure in accordance with one aspect of the present invention. The battery unit mounting structure 100 illustrated in FIG. 1 is equipped with a battery transfer apparatus (battery unit mounting apparatus) 20 to be placed under a horizontal bench A carrying an electric vehicle (vehicle) 10. Through an aperture AR of the bench A, the battery transfer apparatus 20 mounts a battery unit 30 to the electric vehicle 10 carried on the bench A from a bottom face 11 side thereof. The battery unit 30 is fixed to a battery fixing part 12 provided in the bottom face 11 of the electric vehicle 10.

The bottom face 11 of the electric vehicle 10 is defined by various members constituting the flooring and bottom frames of the electric vehicle 10, for example. Wheels of the electric vehicle 10 support a vehicle body with undepicted suspensions, which expand and contract according to loads acting on the respective wheels. Therefore, the suspensions expand and contract according to the weight of passengers of the electric vehicle 10, the weight of cargo in the trunk room, and the like, so that the electric vehicle 10 tilts, whereby the bottom face 11 also tilts with respect to the bench A. The battery transfer apparatus 20 has a structure for favorably mounting the battery unit 30 to the electric vehicle 10 whose bottom face 11 is thus tilted. The battery transfer apparatus 20 will be explained in detail.

Figure 2A:
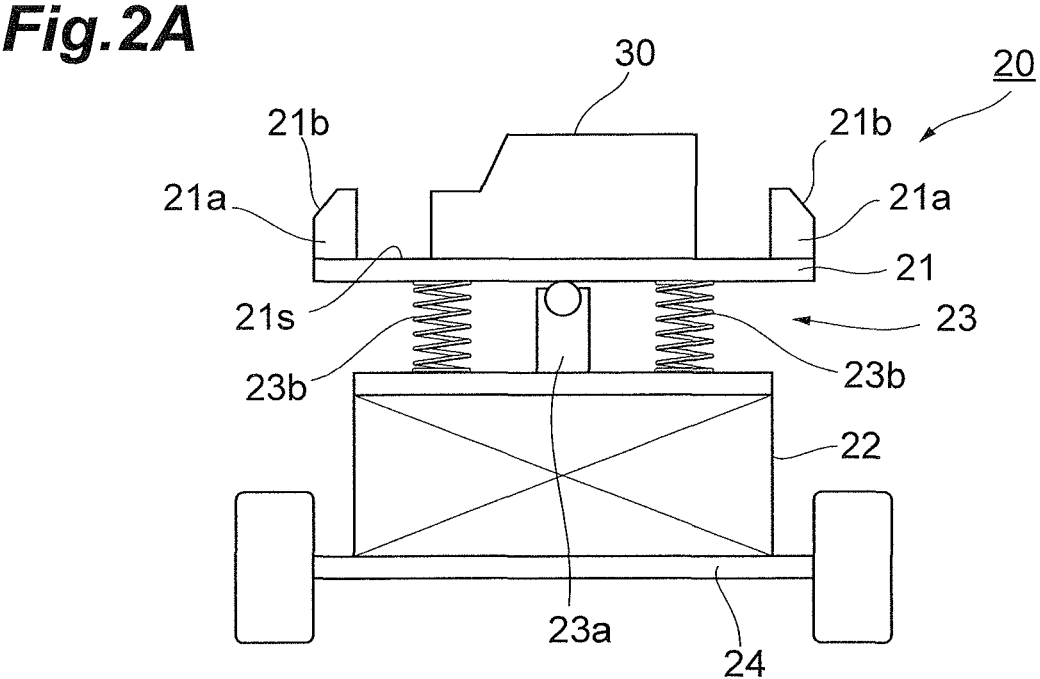
FIGS. 2A and 2B are diagrams illustrating a battery transfer apparatus depicted in FIG. 1.
Figure 2B:
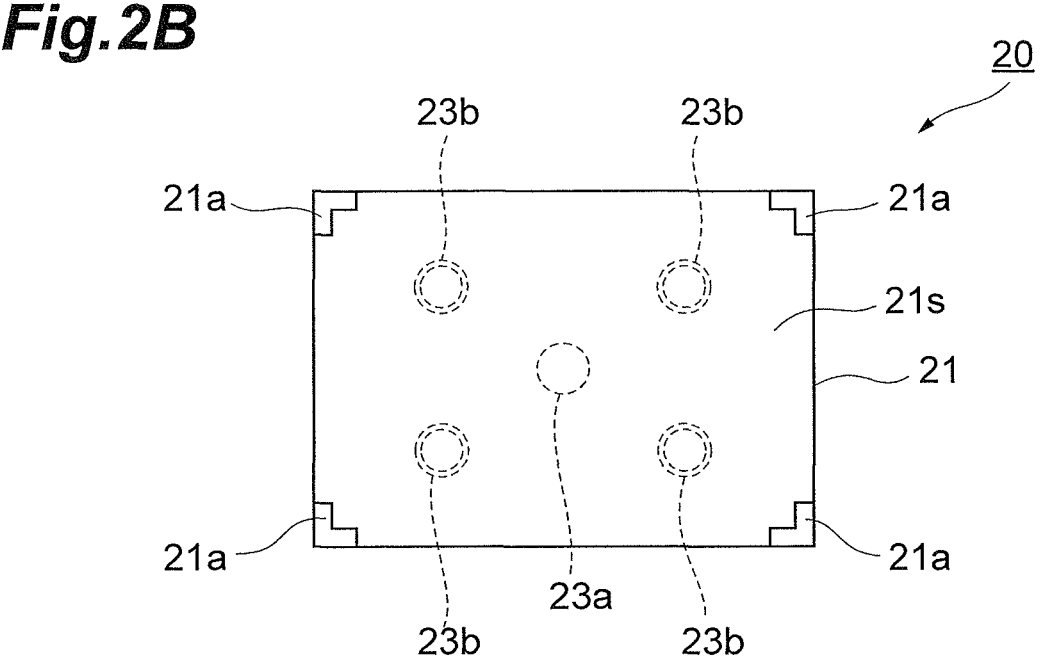

FIGS. 2A and 2B are side and plan views of the battery transfer apparatus depicted in FIG. 1, respectively. As FIGS. 2A and 2B illustrate, the battery transfer apparatus 20 has a table 21, a lift 22, a connection mechanism 23, and a wheeled part 24. The table 21 is shaped into a rectangular plate and has a mount surface 21s for mounting the battery unit 30. As will be explained later, the mount surface 21s of the table 21 is held horizontal in a normal state but can be tilted. The lift 22 moves the table 21 up and down with respect to the bottom face 11 of the electric vehicle 10.

The mount surface 21s of the table 21 is provided with a plurality of rough guides (contact pieces) 21a adapted to come into contact with the bottom face 11 (reference guides 13 which will be explained later in particular) of the electric vehicle 10. The rough guides 21a, each of which exhibits a substantially L-shape in a planar view, are disposed at four corners of the mount surface 21s, respectively. An outer end part of each rough guide 21a is chamfered. That is, an outer part of the rough guide 21a is provided with a slope 21b.

The connection mechanism 23 is disposed between the table 21 and the lift 22. The connection mechanism 23 connects the table 21 and the lift 22 to each other. More specifically, the connection mechanism 23 connects the table 21 and the lift 22 to each other such that the mount surface 21s tilts substantially parallel to the bottom face 11 of the electric vehicle 10 according to the contact between the rough guides 21a on the mount surface 21s of the table 21 and the bottom face 11 (reference guides 13) of the electric vehicle 10.

For this purpose, the connection mechanism 23 has a ball joint 23a and springs (elastic members) 23b. The ball joint 23a is disposed at the center part of the table 21 and connects the table 21 and the lift 22 to each other while making the mount surface 21s of the table 21 tiltable (rotatable). The springs 23b are arranged at four locations corresponding to the rough guides 21a, respectively, so as to surround the ball joint 23a between the table 21 and the lift 22. When the mount surface 21s tilts, the springs 23b generate such an elastic force as to return it to the horizontal state.

Such a structure enables the connection mechanism 23 to keep the mount surface 21s of the table 21 horizontal by the elastic force of the springs 23b in the normal state and, when the rough guides 21a of the mount surface 21s are in contact with the bottom face 11 (reference guides 13) of the electric vehicle 10, tilt the mount surface 21s centered upon the ball joint 23a against the elastic force of the springs 23b, so as to make the mount surface 21s and the bottom face 11 of the electric vehicle 10 substantially parallel to each other.

As FIG. 1 illustrates, the battery unit mounting structure 100 is equipped with the reference guides (guide members) 13 disposed on the bottom face 11 of the electric vehicle 10. When the table 21 is moved up by the lift 22 in order to mount the battery unit 30, the reference guides 13 come into contact with the rough guides 21a disposed on the mount surface 21s of the table 21, thereby tilting the mount surface 21s of the table 21 substantially parallel to the bottom face 11 of the electric vehicle 10 without bringing the rough guides 21a into first contact with the bottom face 11 of the electric vehicle 10. Therefore, the reference guides 13 are disposed at four locations of the bottom face 11 of the electric vehicle 10 so as to correspond to the respective rough guides 21a on the mount surface 21s of the table 21.

Figure 3A:
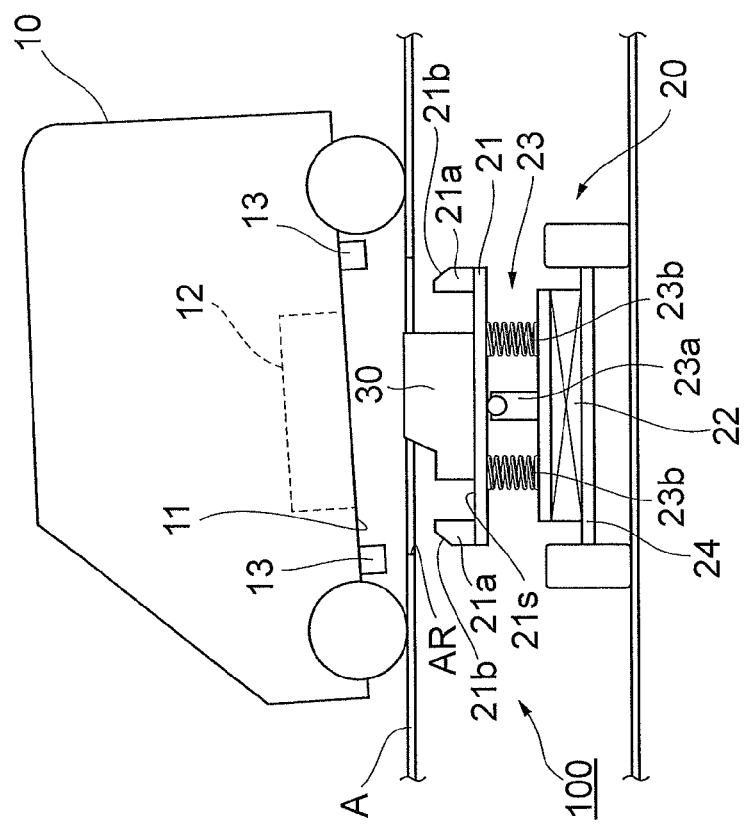
FIGS. 3A and 3B are diagrams for explaining how to mount a battery unit by using the battery unit mounting structure depicted in FIG. 1.

Steps of mounting the battery unit 30 to the electric vehicle 10 by using the battery unit mounting structure 100 will now be explained with reference to FIGS. 3A, 3B, 4A, and 4B. First, as FIG. 3A illustrates, the electric vehicle 10 is placed on the bench A such that the battery fixing part 12 provided in the bottom face 11 of the electric vehicle 10 is located directly above the aperture AR of the bench A. Here, the electric vehicle 10 (i.e., the bottom face 11 of the electric vehicle 10) is tilted such that its front part is closer to the bench A than is its rear part.

While placing the electric vehicle 10, the battery transfer apparatus 20 is moved (since it is movable by the wheeled part 24) to a location directly under the aperture AR of the bench A. At this time, the battery fixing part 12 of the electric vehicle 10 and the battery unit 30 mounted on the mount table 21s of the table 21 of the battery transfer apparatus 20 may be aligned with each other by a known method.

Figure 3B:
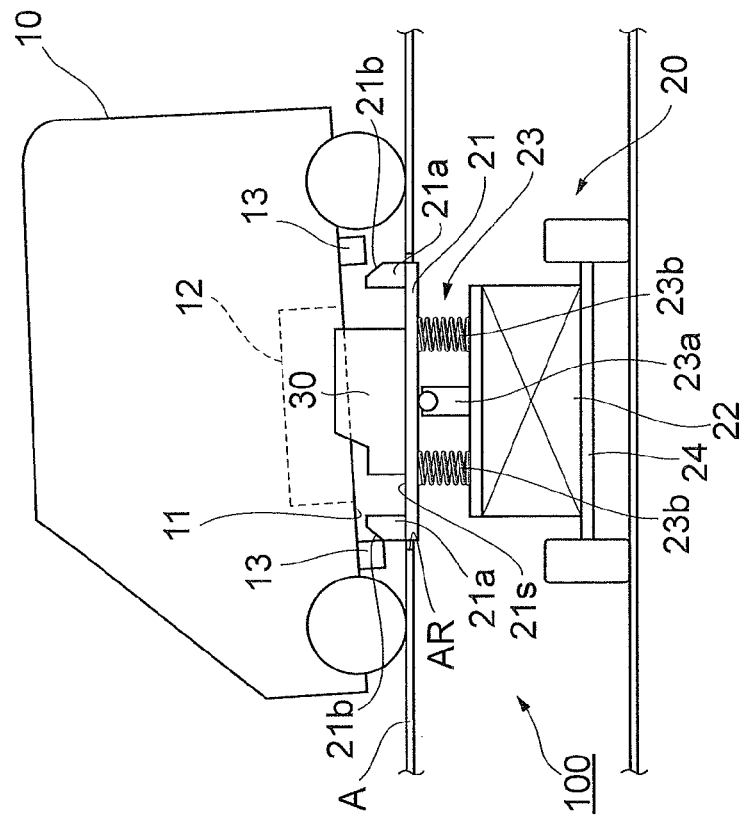

Subsequently, as FIG. 3B illustrates, the lift 22 of the battery transfer apparatus 20 moves up the table 21 mounted with the battery unit 30. This brings the rough guides 21a disposed on the mount surface 21s of the table 21 into contact with the reference guides 13 provided on the bottom face 11 of the electric vehicle 10. Here, since the electric vehicle 10 is tilted forward, the reference guides 13 located on the front side of the electric vehicle 10 come into contact with their corresponding rough guides 21a. The reference guides 13 prevent the rough guides 21a from coming into first contact with the bottom face 11 of the electric vehicle 10, and the battery unit 30 from coming into contact with the electric vehicle 10 before the reference guides 13 come into contact with the rough guides 21a.

Next, as FIG. 4A illustrates, the table 21 of the battery transfer apparatus 20 is further moved up. Consequently, according to the contact between the reference guides 13 and rough guides 21a on the front side of the electric vehicle 10, the mount surface 21s of the table 21 is tilted against the elastic force of the corresponding springs 23b (as the springs 23b on the front side of the electric vehicle 10 contract while their opposing springs 23b expand here).

Hence, the mount surface 21s of the table 21 of the battery transfer apparatus 20 and the bottom face 11 of the electric vehicle 10 become substantially parallel to each other. Here, since the slopes 21b are formed on the outer side of the rough guides 21a, the reference guides 13 come into contact with the slopes 21b. Therefore, as the table 21 of the battery transfer apparatus 20 ascends, it is guided by sliding between the slopes 21b of the rough guides 21a and the reference guides 13. As a result, the battery unit 30 on the table 21 and the battery fixing part 12 on the electric vehicle 10 side are aligned with each other.

Then, in the state where the mount surface 21s of the table 21 is tilted substantially parallel to the bottom face 11 of the electric vehicle 10 as FIG. 4B illustrates, the table 21 is further moved up by the lift 22, whereby the battery unit 30 is mounted and fixed to the battery fixing part 12 on the electric vehicle 10 side.

As explained in the foregoing, the battery unit mounting structure 100 in accordance with this embodiment is equipped with the battery transfer apparatus 20. In the battery transfer apparatus 20, the table 21 mounting the battery unit 30 and the lift 22 for moving the table 21 up and down with respect to the electric vehicle 10 are connected to each other by the connection mechanism 23. In particular, the connection mechanism 23 connects the table 21 and the lift 22 to each other such that the mount surface 21s tilts substantially parallel to the bottom face 11 of the electric vehicle 10 according to the contact between the rough guides 21a disposed on the mount surface 21s of the table 21 and the bottom face 11 (reference guides 13) of the electric vehicle 10.

Therefore, moving up the table 21 by the lift 22 in order to mount the battery unit 30 to the electric vehicle 10 in the battery unit mounting structure 100 in accordance with this embodiment makes the mount surface 21s substantially parallel to the bottom face 11 of the electric vehicle 10 (i.e., the mount surface 21s follows the bottom face 11 of the electric vehicle 10 so as to absorb the inclination of the bottom face 11). Hence, even when the electric vehicle 10 is tilted, the battery unit mounting structure 100 in accordance with this embodiment can, in a simple structure, easily mount the battery unit 30 to the electric vehicle 10.

In particular, the battery unit mounting structure 100 in accordance with this embodiment is equipped with the reference guides 13 disposed on the bottom face 11 of the electric vehicle 10 and, when the table 21 is moved up in order to mount the battery 30 to the electric vehicle 10, the rough guides 21a provided on the mount surface 21s of the table 21 are thus prevented from coming into first contact with the bottom face 11 of the electric vehicle 10, and the battery unit 30 is prevented from first coming into contact with the electric vehicle 10. The bottom face 11 is also prevented from being damaged due to first contact with the rough guide 21a. The reference guide 13 is easily exchangeable.

The foregoing embodiment explains an embodiment of the battery unit mounting apparatus and battery unit mounting structure in accordance with one aspect of the present invention. Therefore, the battery unit mounting apparatus and battery unit mounting structure in accordance with one aspect of the present invention are not limited to the above-mentioned battery transfer apparatus 20 and battery unit mounting structure 100. The battery unit mounting apparatus and battery unit mounting structure in accordance with one aspect of the present invention may be those in which the above-mentioned battery transfer apparatus 20 and battery unit mounting structure 100 are modified arbitrarily within the scope not altering the gist set forth in each claim.

For example, while the above-mentioned embodiment is configured such that the rough guides 21a disposed on the mount surface 21s come into contact with the reference guides 13 of the electric vehicle 10, at least one of the rough guides 21a and reference guides 13 are not always necessary for the mount surface 21s to attain a predetermined inclination. For example, it has been known to provide latches (lock mechanisms) and strikers as means for fixing a battery unit to an electric vehicle at a plurality of locations of the battery unit and their corresponding locations on the bottom face of the vehicle body. Such battery unit fixing means can be employed for the battery unit mounting structure in accordance with one aspect of the present invention without rough guides and reference guides. When the battery unit is moved up in the case where the lock mechanisms and strikers are arranged on the battery unit side and vehicle body side, respectively, one of the lock mechanisms firstly comes into contact with its corresponding striker, so that a reaction force from the striker acts on the table through the battery unit, whereby the mount surface starts tilting. As mentioned above, the lock mechanisms and strikers come into contact with each other, whereby the mount surface finally attains a predetermined inclination.

In the battery transfer apparatus 20, the connection mechanism 23 may have, in place of the ball joint 23a, any element which can connect the table 21 and the lift 22 to each other while making the mount surface 21s of the table 21 tiltable (rotatable).

In the battery transfer apparatus 20, the connection mechanism 23 may have, in place of the springs 23b, any member, component, and the like which can generate an elastic force between the table 21 and the lift 22 in order to regulate the inclination of the mount surface 21s of the table 21 and keep the mount surface 21s horizontal.

What is claimed is:

1. A battery unit mounting apparatus for mounting a battery unit to a vehicle from a bottom face side of the vehicle, the apparatus comprising:
   a table having a mount surface for mounting the battery unit;
   a lift for moving the table up and down with respect to the bottom face of the vehicle; and
   a connection mechanism for connecting the table and the lift to each other;
   wherein the connection mechanism connects the table and the lift to each other such that the table comes into contact with the bottom face of the vehicle so as to tilt the mount surface by a predetermined inclination with respect to the bottom face of the vehicle;
   wherein the mount surface of the table is provided with a plurality of contact pieces adapted to come into contact with the bottom face of the vehicle when the table is moved up by the lift; and
   wherein the mount surface tilts substantially parallel to the bottom face of the vehicle according to the contact between the contact pieces of the mount surface and the bottom face of the vehicle.

2. A battery unit mounting apparatus according to claim 1, wherein the connection mechanism has a ball joint for connecting the table and the lift to each other while making the mount surface of the table tiltable, and an elastic member for generating an elastic force between the table and the lift so as to regulate the tilt of the mount surface.

3. A battery unit mounting structure for mounting a battery unit to a vehicle from a bottom face side of the vehicle, the structure comprising:

the battery unit mounting apparatus according to claim 1; and a guide member, disposed on the bottom face of the vehicle, for tilting the mount surface substantially parallel to the bottom face by coming into contact with the contact piece disposed on the mount surface.

\* \* \* \* \*